Nov. 22, 1960   D. H. SINKER ET AL   2,960,998
CHECK VALVE
Filed April 30, 1956

DAVID H. SINKER
ROBERT A. SINKER
INVENTORS.

BY Flam and Flam
ATTORNEYS.

United States Patent Office 2,960,998
Patented Nov. 22, 1960

2,960,998

CHECK VALVE

David H. Sinker, 1242 Smithwood Drive, Los Angeles 35, Calif., and Robert A. Sinker, 1916 San Ysidro Drive, Beverly Hills, Calif.

Filed Apr. 30, 1956, Ser. No. 581,780

1 Claim. (Cl. 137—542)

This invention relates to check valves. Such valves are intended to stop the flow of the fluid medium in a direction reverse to that desired, and are now extensively utilized for the control of gases or liquids.

It is one of the objects of this invention to improve and simplify valves of this character, in which a resilient element is used as a closure or seat.

It is another object of this invention to make it possible for the valve positively to close against reverse flow even when the pressure differential urging the valve closure to closed position is very low.

It is another object of this invention to make it possible to operate the valve at such low pressure differential, and yet cause the valve to operate effectively at high or medium pressures without injury to any of the valve parts, such as permanent deformation of the resilient element.

It is another object of this invention to provide a valve structure of this character which can operate successfully in any position, and also in unfavorable environment, such as those causing vibration or shock.

In order to accomplish these results, a valve closure or seat is used that is made of resilient or yielding material, such as rubber, which is compressed for positive closure, and means are provided to limit this compression.

The structure of the valve is such that it may be used advantageously as a pressure reducing valve, or other types of valves in addition to its use as a check valve.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claim.

Referring to the drawings.

Figure 1:
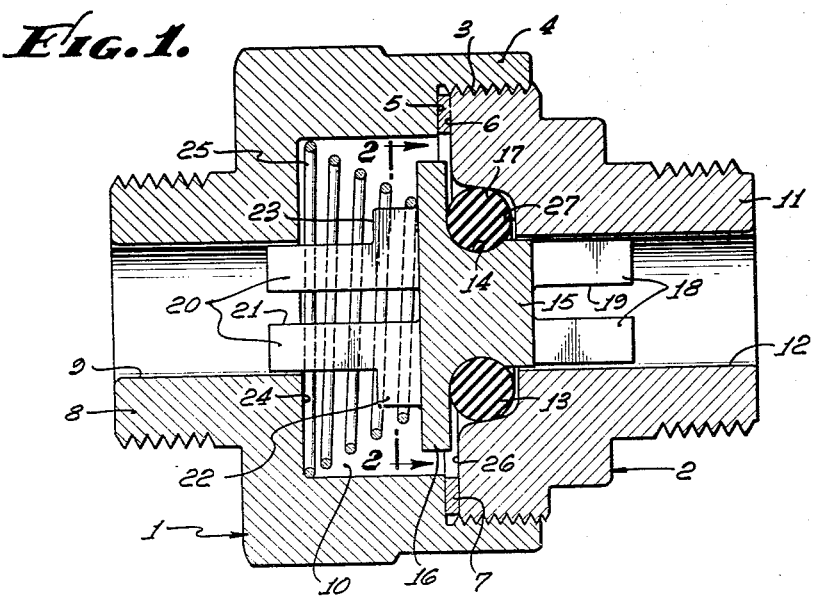
Figure 1 is a longitudinal sectional view of a check valve structure incorporating the invention, shown in closed position.

In the present instance, a valve body is formed by the aid of two body members 1 and 2. These are joined together as by the aid of the threaded connection 3, the body element 1 in this instance having an internally threaded flange 4 engaging external threads on the body member 2. Opposing shoulders 5 and 6 of the members 1 and 2 serve to compress a packing or gasket 7 to form a fluid-tight joint.

Member 1 carries a threaded hollow boss 8 having a port 9 communicating with a valve chamber 10. The body member 2 carries a boss 11 having a port 12 also communicating with the chamber 10 when the valve is open.

The ports 9 and 10 are in substantial linear alignment; port 12 being the inlet port, and port 9 being the outlet port.

The bosses 8 and 11 form appropriate means for connection into a system utilizing fluid under pressure, such as compressed air, liquid paint, or the like.

Figure 4:
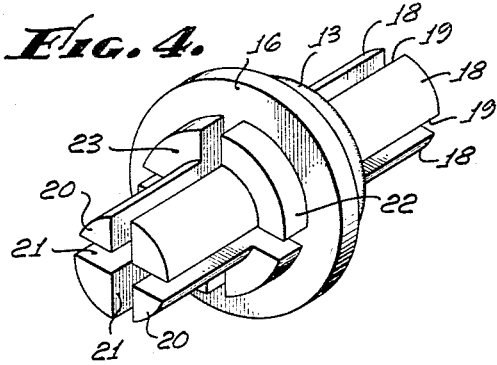
Fig. 4 is a pictorial view of the valve closure structure.

In order to check the passage of the fluid medium from the chamber 10 to the port 12, a movable closure structure is provided. This closure structure includes an annular flexible member or ring 13, such as one made of rubber, accommodated in a shallow arcuate groove 14 peripherally formed on an operator 15. This operator 15 is shown to best advantage in Fig. 4. It includes a flange 16, one surface of which forms an extension of the arcuate groove 14.

The annular ring 13 has forwardly and peripherally exposed annular portions cooperating with a seat formed about the port 12. The seat has, in essence, two contiguous portions respectively cooperable with the forward and peripheral portions of the ring 13 that are exposed. One portion 27 extends substantially radially as a shoulder from the port or opening 12 to form an abutment-type limit stop against which the forwardly exposed portion of the ring may be compressed and distorted. This seat portion 27 is located in inwardly spaced relationship with respect to the surface 26.

The second portion 17 of the seat adjoins the outer boundary of the first seat portion 27. The second seat portion 17 extends substantially axially rather than radially, the seat portion 17 diverging by only a few degrees in a direction inwardly of the valve. The tapered seat portion 27 extends continuously to a diameter in excess of the maximum diameter of the ring 13. The tapered seat portion 27 is of such size that the ring is very slightly and delicately constricted by engagement of its peripherally exposed portion with the tapered seat portion 17 before the forwardly exposed portion of the ring 13 engages the radial seat portion 27.

Figure 2:
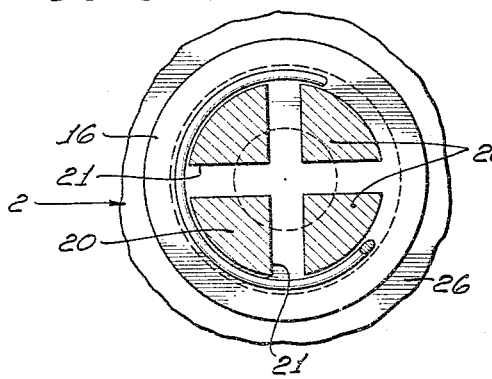
Fig. 2 is a fragmentary sectional view taken along a plane corresponding to line 2—2 of Fig. 1.

Guiding extensions 18 are received in the port 12 so as to restrain the operator 15 against undue cocking action. These guides 18, as shown most clearly in Fig. 2, have arcuate outer surfaces separated by slots 19, there being four such arcuate surfaces 18.

In order to provide a further guide for the movement of the operator 15, similar guiding extensions 20 are provided on the left-hand side of the operator, adapted to extend into the port 9. The outer diameter of ring 13, as clearly shown in Fig. 1, is such that it first engages the counterbore 17 near its outer enlarged end. As the ring 13 moves inwardly of the bore 17, a very slight deformation of the ring 13 results. These guide members 20 are provided by the cuts or slots 21. Guides 20 extend from enlarged arcuate members 22.

In normal operation and when the check valve is open in response to preponderant pressure in port 12, the guides 20 are urged toward the left until the left-hand surfaces 23 of the arcuate members 22 contact the inner surface 24 of the body member 1. Under such circumstances, the annular member 13 is moved far enough to the left to permit free passage of the fluid past the annular member or ring 13 into chamber 10, and then via slots 21 to the outlet port 9. A conical compression spring 25, however, resists this movement by a relatively minor force. Accordingly, the valve structure can be utilized in any position without danger of misalignment of the parts or of inadvertent movement of the operator 15.

Figure 3:
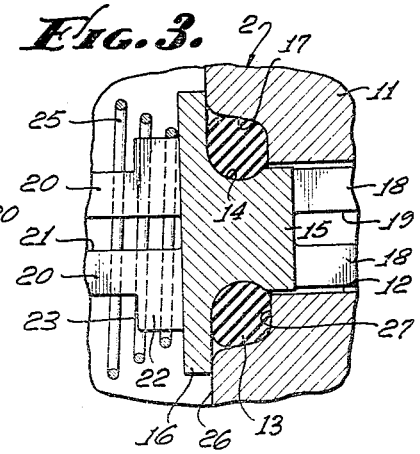
Fig. 3 is a fragmentary view similar to Fig. 1 showing the valve closure in limiting valve closing position.

The closed position for light back pressures is indicated in Fig. 1. In this condition, the annular ring 13 is only slightly deformed and wedges into the tapered seat portion 17. Due to this wedging action, a substantially perfect seal can be obtained for the port 12, even for very low pressure differentials, preventing reverse of the fluid flow outwardly of the port 12. Upon greater reverse pressure, the flange 16, as indicated in Fig. 3, is positively stopped, but only after the ring 13 is to some extent flattened against the radial seat portion 27. Inward movement of the closure structure is limited by the surface 26 formed on the inner side of the body member 2 cooperating with the flange 16. In this position, as indicated in Fig. 3, the annular member 13 is substantially deformed and seats on the radial seat portion 27 surrounding the port 12. There is a limit to this deformation due to the positive engagement of the flange 16 with the surface 26. Accordingly, there can be no undue strain upon the ring member 13. It is accordingly possible to dislodge the ring 13 when there is a preponderance of pressure in port 12.

The valve structure can be used for other than check valves; for example, it may be readily adapted to operate as an electromagnetically or manually operated valve or as a pressure reducing valve.

The inventors claim:

In a valve structure: a body member having a surface and an opening extending inwardly from the surface; means forming a seat extending inwardly of the surface and surrounding the opening, said seat having two operative portions, one portion extending substantially radially as a shoulder from said opening, and in inwardly spaced relationship with respect to said surface; the other seat portion extending generally axially of the opening and from the outer area of said one seat portion to said surface, and diverging in a direction toward the said surface; an operator; a circular ring carried by the operator and having an outer arcuate configuration exposed forwardly and peripherally for cooperation with the said seat portions respectively; said ring being of flexible resilient material; means guiding the operator for movement toward and away from said seat so that the ring is aligned with the axially extending seat portion at least upon engagement between the ring and the said axially extending seat portion; the taper of said axially extending seat portion being slight and not more than a few degrees at the axial position corresponding to the normal maximum diameter of said ring whereby slight axial pressures are translated into high seating pressures; the inwardly adjoining portions of said axially extending seat portion being likewise of slight taper of not more than a few degrees whereby the ring may be wedged therein; the outwardly adjoining portions of said axially extending seat portion being tapered and continuous from said one axial position whereby the ring is free of shear as it enters the seat; said operator having a part engageable with said surface for limiting the extent of entering movement of said ring whereby the distortion and constriction of the ring is maintained at a low level independently of the force applied to said operator; the distance of said one seat portion from said surface being only slightly less than the distance of the forwardly exposed portion of the ring from said operator part so that said surface is engaged by said operator part only after a small constriction of the ring.

References Cited in the file of this patent

UNITED STATES PATENTS

| 820,239 | Moss | May 8, 1906 |
| 1,678,745 | Wilson | Oct. 16, 1928 |
| 2,431,437 | Van Der Werff | Nov. 25, 1947 |
| 2,481,482 | Green | Sept. 13, 1949 |
| 2,608,376 | Adams | Aug. 26, 1952 |
| 2,624,542 | Ghormley | Jan. 6, 1953 |
| 2,656,144 | Frantz | Oct. 20, 1953 |
| 2,706,487 | Wilson | Apr. 19, 1955 |
| 2,827,922 | Guinard | Mar. 25, 1958 |

FOREIGN PATENTS

| 646,849 | Great Britain | Nov. 29, 1950 |